United States Patent [19]

Nozaki et al.

[11] Patent Number: 5,547,438
[45] Date of Patent: Aug. 20, 1996

[54] CONTROL APPARATUS FOR RAISING THE IDLE SPEED (ISC VALUE) AFTER THE LOCKUP CLUTCH IS UNLOCKED

[75] Inventors: Kazutoshi Nozaki; Kunihiro Iwatsuki; Tooru Matsubara, all of Toyota, Japan

[73] Assignee: Toyota Jidosha Kabushiki Kaisha, Toyota, Japan

[21] Appl. No.: 297,855

[22] Filed: Aug. 30, 1994

[30] Foreign Application Priority Data

Sep. 10, 1993 [JP] Japan .................... 5-225403

[51] Int. Cl.⁶ .......................... F16H 61/14; F02D 29/00
[52] U.S. Cl. .............................. 477/169; 477/175
[58] Field of Search ........................ 477/168, 169, 477/174, 175, 181; 192/106.1; 123/327, 339.16

[56] References Cited

U.S. PATENT DOCUMENTS

| | | | |
|---|---|---|---|
| 4,484,497 | 11/1984 | Hibino | 477/169 |
| 4,508,074 | 4/1985 | Yamato et al. | 123/327 |
| 4,632,231 | 12/1986 | Hattori et al. | 477/175 |
| 4,700,674 | 10/1987 | Iwata | 123/327 |
| 4,716,999 | 1/1988 | Tezuka et al. | 477/168 X |
| 4,870,933 | 10/1989 | Mizuno | 123/327 X |
| 4,881,627 | 11/1989 | Ishii | 477/168 |
| 4,957,194 | 9/1990 | Sawa et al. | 477/169 |
| 5,062,517 | 11/1991 | Muchmore et al. | 192/106.1 X |
| 5,088,582 | 2/1992 | Saitou et al. | 477/169 |
| 5,141,089 | 8/1992 | Nobumoto et al. | 477/169 |
| 5,207,198 | 5/1993 | Eisele | 477/176 X |
| 5,277,286 | 1/1994 | Yamamoto et al. | 477/175 X |
| 5,325,946 | 7/1994 | Kashiwabara et al. | 477/168 X |

FOREIGN PATENT DOCUMENTS

| | | |
|---|---|---|
| 60-35147 | 2/1985 | Japan . |
| 60-179566 | 9/1985 | Japan . |

*Primary Examiner*—Khoi Q. Ta
*Attorney, Agent, or Firm*—Oblon, Spivak, McClelland, Maier & Neustadt, P.C.

[57] ABSTRACT

An apparatus for controlling an engine of a motor vehicle, and a lock-up clutch disposed between the engine and an automatic transmission for direct connection therebetween. The apparatus includes a lock-up clutch control device for engaging the lock-up clutch during deceleration of the motor vehicle, a vehicle deceleration detector for detecting a decelerating state of the motor vehicle, and an engine deceleration restrictor for restricting a rate of decrease of the engine speed for a period following detection of the decelerating state of the vehicle, so as to facilitate an engaging action of the lock-up clutch during deceleration of the vehicle.

11 Claims, 8 Drawing Sheets

| SHIFT LEVER/ TRANSMISSION POSITIONS | | SOLENOIDS | | | | | | CLUTCHES | | | BRAKES | | | | |
|---|---|---|---|---|---|---|---|---|---|---|---|---|---|---|---|
| | | S1 | S2 | S3 | S4 | SLU | SLN | C1 | C2 | C0 | B1 | B2 | B3 | B4 | B0 |
| P | | O | X | X | X | X | X | X | X | X | X | X | X | O | X |
| R | (V<20) | X | X | X | O | X | X | X | O | X | X | X | X | O | O |
| R | (V≥20) | O | O | X | O | X | X | X | X | X | X | X | X | X | X |
| N | | O | X | X | X | X | X | X | X | X | X | X | X | O | X |
| D · 3 · 2 · (L) | 1ST NORMAL RUN | O | X | O | O | X | X | O | X | O | X | X | X | X | X |
| D · 3 · 2 · (L) | 1ST ENGINE BRAKE RUN | O | X | O | X | X | O | O | X | O | X | X | X | O | X |
| D · 3 · 2 · (L) | 2ND NORMAL RUN | O | O | O | O | X | X | O | X | X | X | O | X | X | X |
| D · 3 · 2 · (L) | 2ND ENGINE BRAKE RUN | O | O | O | X | X | O | O | X | O | X | O | O | X | X |
| D · 3 · 2 · (L) | 3RD NORMAL RUN | X | O | O | O | ◎ | X | O | X | O | X | O | X | X | X |
| D · 3 · 2 · (L) | 3RD ENGINE BRAKE RUN | X | O | X | X | ◎ | O | O | O | O | O | O | X | X | X |
| D · 3 · 2 · (L) | 4TH | X | X | X | O | ◎ | X | O | O | O | X | O | X | X | X |
| D · 3 · 2 · (L) | 5TH | X | X | X | O | ◎ | X | O | O | X | X | O | X | X | O |

LEGENDS:
- O : ON / ENGAGED
- X : OFF / RELEASED
- ◎ : ON; FOR ENGAGING CLUTCH 24 / OFF; FOR RELEASING CLUTCH 24

FIG. 8(a) PRIOR ART   ISC VALVE 83

FIG. 8(b) PRIOR ART   ENGINE SPEED $N_E$ (rpm) TURBINE SPEED $N_T$ (rpm)   OUTPUT TORQUE $T_o$ FIG. 8(c) PRIOR ART   DRIVE SIGNAL $I_{SLU}$ PRESSURE $P_{SLU}$ FIG. 8(d) PRIOR ART   THROTTLE VALVE OPENING $\theta$ TH

CONTROL APPARATUS FOR RAISING THE IDLE SPEED (ISC VALUE) AFTER THE LOCKUP CLUTCH IS UNLOCKED

BACKGROUND OF THE INVENTION

1. Field of the Invention

The present invention relates in general to an apparatus for controlling an engine of a motor vehicle and a lock-up clutch disposed between the engine and an automatic transmission. More particularly, the invention is concerned with a technique for assuring engagement of the lock-up clutch by such control apparatus during deceleration of the vehicle.

2. Discussion of the Related Art

A lock-up clutch is provided on a motor vehicle with an automatic transmission, so that an engine of the vehicle is directly connected to the automatic transmission when the lock-up clutch is in the engaged state. For such motor vehicle, there is known an engine control apparatus capable of controlling the vehicle engine in a "fuel cut" mode when the vehicle is decelerating, for example, when the vehicle is coasting with the accelerator pedal placed in its non-operated position. In the fuel cut mode, a fuel supply to the engine is cut as long as the engine speed is higher than a predetermined fuel-cut speed. On some motor vehicles, such engine control apparatus is adapted to engage the lock-up clutch so that the engine speed is held higher than the fuel-cut speed for a longer period of time, for cutting the fuel supply to the engine for an accordingly long period of time. An example of such engine control apparatus is disclosed in JP-A-60-179566 (published in 1985).

According to the known engine control apparatus indicated above, the lock-up clutch is brought to the fully engaged state when a throttle sensor detects that the throttle valve is placed in its fully-closed position. In this condition, the speed of the input shaft of the automatic transmission is higher than the engine speed, and a torque is transmitted in a reverse direction from the drive wheels to the engine when the lock-up clutch is engaged. Generally, the lock-up clutch is provided with a damper which is so designed as to permit smooth engagement of the lock-up clutch when the engine speed is higher than the input shaft speed of the automatic transmission. Accordingly, when the engine speed is lower than the input shaft speed of the transmission as in the case of vehicle deceleration or coasting with the throttle valve fully closed, the lock-up clutch cannot be smoothly engaged. Difficulty of the engaging action increases with an increase in the speed difference between the input and output coupling members of the lock-up clutch.

SUMMARY OF THE INVENTION

It is therefore an object of the present invention to provide an apparatus for controlling an engine and a lock-up clutch of a motor vehicle, which apparatus assures smooth engagement of the lock-up clutch even during deceleration of the vehicle.

The above object may be achieved according to the principle of this invention, which provides an apparatus for controlling an engine of a motor vehicle, and a lock-up clutch disposed between the engine and an automatic transmission for direct connection therebetween, wherein lock-up clutch control means is provided for engaging the lock-up clutch during deceleration of the motor vehicle, the apparatus comprising: (a) vehicle deceleration detecting means for detecting a decelerating state of the motor vehicle; and (b) engine deceleration restricting means, responsive to an output of the vehicle deceleration detecting means, for restricting a rate of decrease of a speed of the engine for a period following detection of the decelerating state of the motor vehicle by the vehicle deceleration detecting means. After the engine deceleration restricting means is operated, the lock-up clutch control means commands the lock-up clutch to be engaged.

According to the control apparatus of the present invention constructed as described above, the rate of decrease of the engine speed is restricted by the vehicle deceleration restricting means for a period following the detection of a decelerating state of the vehicle by the vehicle deceleration detecting means, to facilitate an engaging action of the lock-up clutch commanded by the lock-up clutch control means upon deceleration of the vehicle.

In the conventional engine control apparatus without the engine deceleration restricting means provided according to the present invention, the engine speed tends to be relatively rapidly lowered below the input speed of the transmission a short time after the vehicle deceleration is started with the accelerator pedal being released. In the engine control apparatus according to the present invention, the engine deceleration restricting means restricts the rate of decrease of the engine speed after a decelerating state of the motor vehicle is detected. As a result, the engine speed is slowly lowered and maintained to be higher than the input speed of the transmission, so that the lock-up clutch can be easily or smoothly engaged when the engine speed has been lowered to the input speed of the transmission, or to a level slightly higher than the transmission input speed. Even if the engine speed is lowered below the transmission input speed, a difference of the engine speed from the transmission input speed when the lock-up clutch is commanded to be engaged can be made sufficiently small. Therefore, the present arrangement permits easy or smooth engagement of the lock-up clutch even when the vehicle is in a decelerating state with a negative drive torque, namely, even when the vehicle is coasting with a torque being transmitted in a direction from the drive wheels of the vehicle to the engine.

Various parameters can be used by the vehicle deceleration detecting means to detect a decelerating state of the vehicle. For example, the vehicle deceleration detecting means detects a decelerating state of the vehicle when the detecting means determines that the accelerator pedal has returned to the non-operated position. Alternatively, the decelerating state of the vehicle can be detected by determining whether the speed of the return movement of the accelerator pedal toward the non-operated position is higher than a predetermined threshold value, or by determining whether the throttle valve has been fully closed, namely, returned to the idling position.

The engine deceleration restricting means may use an idling control valve to restrict the decrease rate of the engine speed. The idling control valve is usually provided for increasing the idling speed of the engine, for example, when the engine temperature is lower than a given lower limit, or when an air conditioner is on. The engine deceleration restricting means may comprise commanding means for activating the idling speed control valve so that the engine speed when the accelerator pedal is in the non-operated position is higher after the decelerating state of the vehicle is detected than before the decelerating state is detected. However, the engine decelerating restricting means may use other devices for restricting the decrease rate of the engine speed, for example, a fuel injector valve.

The present apparatus is effective particularly when fuel-cut means is provided for cutting a fuel supply to the engine when the vehicle is decelerating or coasting with the accelerator pedal placed in the non-operated position. Described more particularly, when the fuel-cut means is operated, the lock-up clutch is engaged to prolong the period during which the fuel supply to the engine is cut, that is, the period during which the engine speed is higher than a predetermined fuel-cut level. As described above, the present apparatus permits easy or smooth engagement of the lock-up clutch in this instance, even where the lock-up clutch is provided with a damper constructed so as to absorb an engaging shock of the input and output coupling members of the lock-up clutch when the engine speed is higher than the transmission input speed.

BRIEF DESCRIPTION OF DRAWINGS

The above and other objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
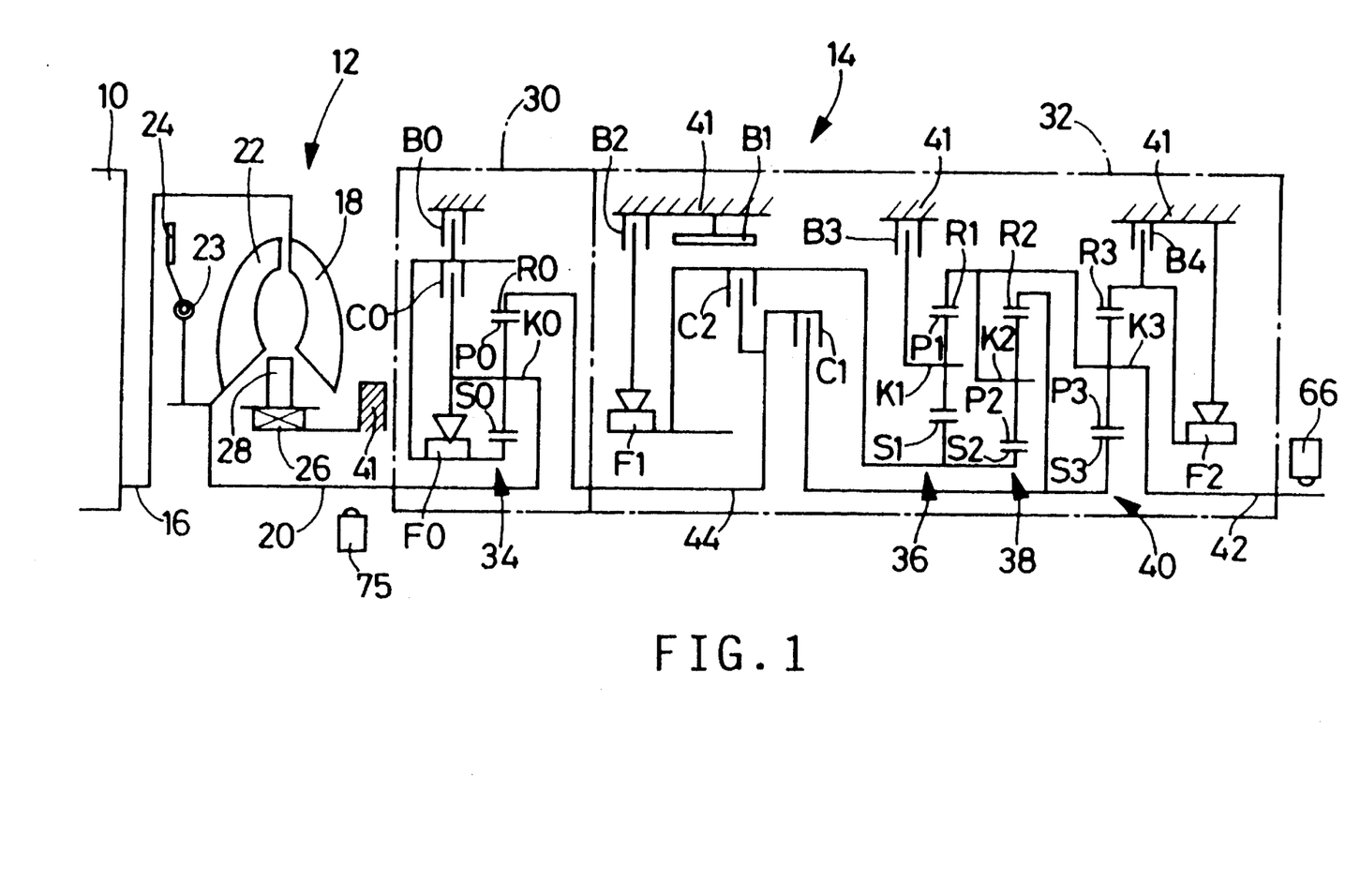
FIG. 1 is a schematic view illustrating an arrangement of an automatic transmission of a motor vehicle, and a lock-up clutch which is connected to the transmission and which is controlled by a control apparatus constructed according to one embodiment of this invention.

Referring first to FIG. 1, there is shown a power transmitting system of a motor vehicle wherein an output of an engine 10 is received by an automatic transmission 14 via a torque converter 12, and transmitted to the drive wheels of the vehicle through a differential gear device and an axle as well known in the art of automobiles.

The torque converter 12 includes: a pump impeller 18 connected to a crankshaft 16 of the engine 10; a turbine runner 22 connected to an input shaft 20 of the automatic transmission 14; a lock-up clutch 24 which is supported by a damper 23 and connects the pump impeller 18 and the turbine runner 22, for direct connection of the engine 10 and the transmission 14, when the clutch 14 is placed in its engaged position; and a stator 28 which is prevented by a one-way clutch 26 from rotating in one of the opposite directions.

The automatic transmission has a first planetary gear device 30 having a high-speed position and a low-speed position, and a second planetary gear device 32 which has a rear drive position and five forward drive positions. The first planetary gear device 30 includes a planetary gear set 34 consisting of a sun gear S0, a ring gear R0, a carrier K0, and a planetary gear P0 which is rotatably supported by the carrier K0 and meshes with the ring gear S0 and the ring gear R0. The first planetary gear device 30 further includes a clutch C0 and a one-way clutch F0 disposed between the sun gear S0 and the carrier K0, and a brake B0 disposed between the sun gear S0 and a housing 41.

The second planetary gear device 32 includes a first planetary gear set 36, a second planetary gear set 38 and a third planetary gear set 40. The first planetary gear set 36 includes a sun gear S1, a ring gear R1, a carrier K1, and a planetary gear P0 which is rotatably supported by the carrier K1 and meshes with the sun gear S2 and the ring gear gear R1. The second planetary gear set 38 includes a sun gear S2, a ring gear R2, a carrier K2, and a planetary gear P2 which is rotatably supported by the carrier K3 and meshes with the sun gear S2 and the ring gear R2. The third planetary gear set 40 includes a sun gear S3, a ring gear R3, a carrier K3, and a planetary gear P3 which is rotatably supported by the carrier K3 and meshes with the sun gear S3 and the ring gear R3.

The sun gears S1, S2 are integrally connected to each other, while the ring gear R1 and the carriers K2 and K3 are integrally connected to each other. The carrier K3 is fixed to an output shaft 42 of the automatic transmission 14. The ring gear R2 is integrally connected to the sun gear S3. A clutch C1 is disposed between the integral body of the ring gear R2 and sun gear S3 and an intermediate shaft 44, while a clutch C2 is disposed between the integral body of the sun gears S1, S2 and the intermediate shaft 44. Further, a brake B2 is provided on the housing 41, for preventing rotations of the sun gears S1, S2. A one-way clutch F1 and a brake B2 are disposed in series between the integral body of the sun gears S1, S2 and the housing 41. The one-way clutch F1 is engaged when power is transmitted to the sun gears S1, S2 so as to rotate these sun gears S1, S2 in the direction opposite to the direction of rotation of the input shaft 20.

A brake B3 is disposed between the carrier K1 and the housing 41, while a brake B4 and a one-way clutch F2 are disposed in parallel between the ring gear R3 and the housing 41. The one-way clutch F2 is engaged when power is transmitted to the ring gear R3 so as to rotate the ring gear R3 in the reverse direction.

Figure 2:
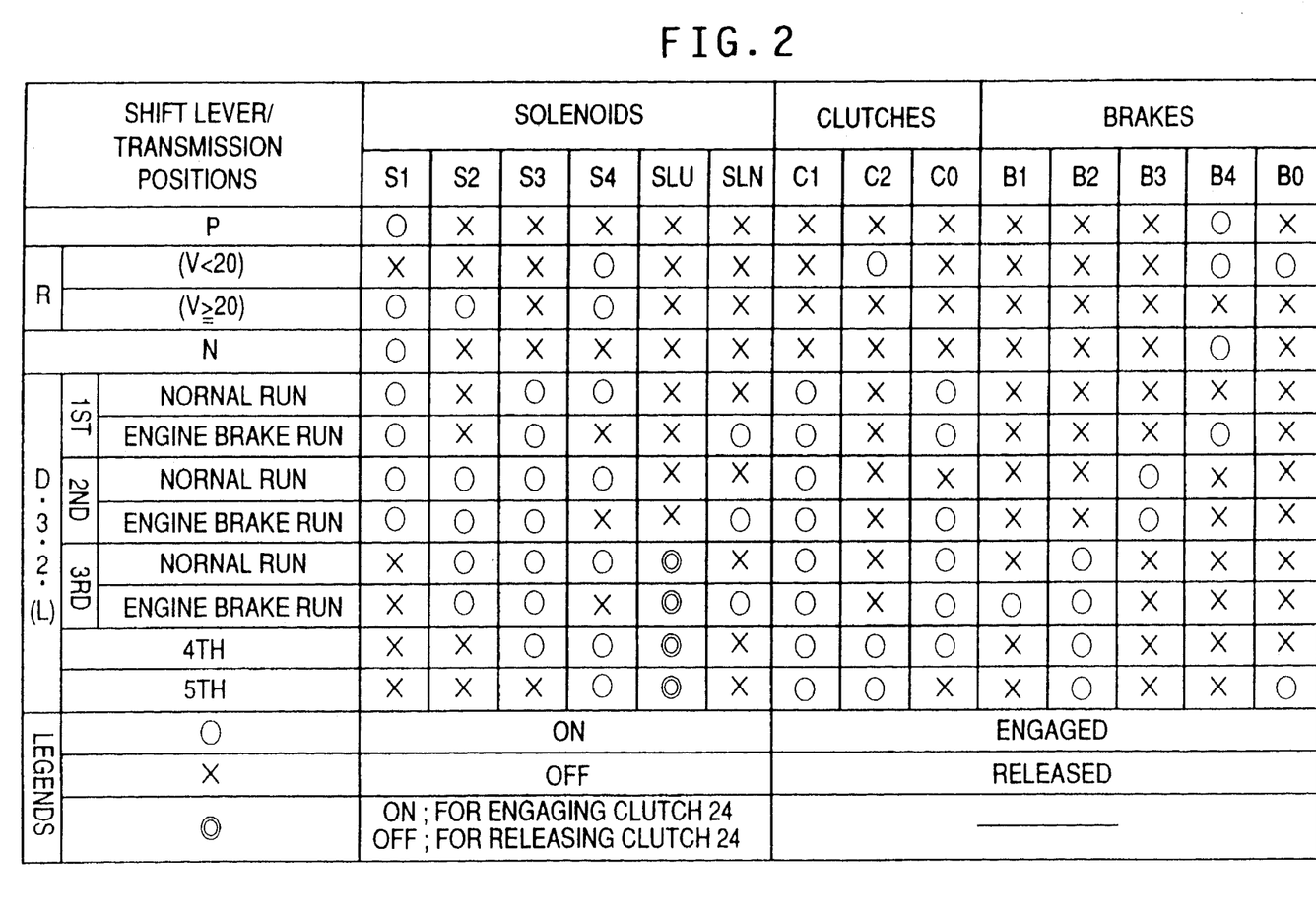
FIG. 2 is a view indicating a relationship between operating positions of the automatic transmission of FIG. 1 and combinations of operating states of frictional coupling devices used to operate the transmission.

The automatic transmission 14 constructed as described above is placed in one of the rear and forward drive positions (R, 1st, 2nd, 3rd, 4th and 5th), depending upon a presently established combination of the operating states of solenoid-operated valves S1, S2 and S3 indicated in FIG. 2. That is, the automatic transmission 14 is shifted by the clutches C0, C1, C2 and brakes B0, B1, B2, B3, B4, which are controlled by the valves S1, S2 and S3, as also indicated in FIG. 2 in relation to the operating positions of the automatic transmission 14. As is apparent from FIG. 2, the brake B3 is engaged when the transmission 14 is shifted up from the first-speed position "1st" to the second-speed position "2nd", and released when the transmission 14 is shifted up from the second-speed position "2nd" to the third-speed position "3rd", while the brake B2 is engaged when the transmission 14 is shifted up from the second-speed position "2nd" to the third-speed position "3rd".

Figure 3:
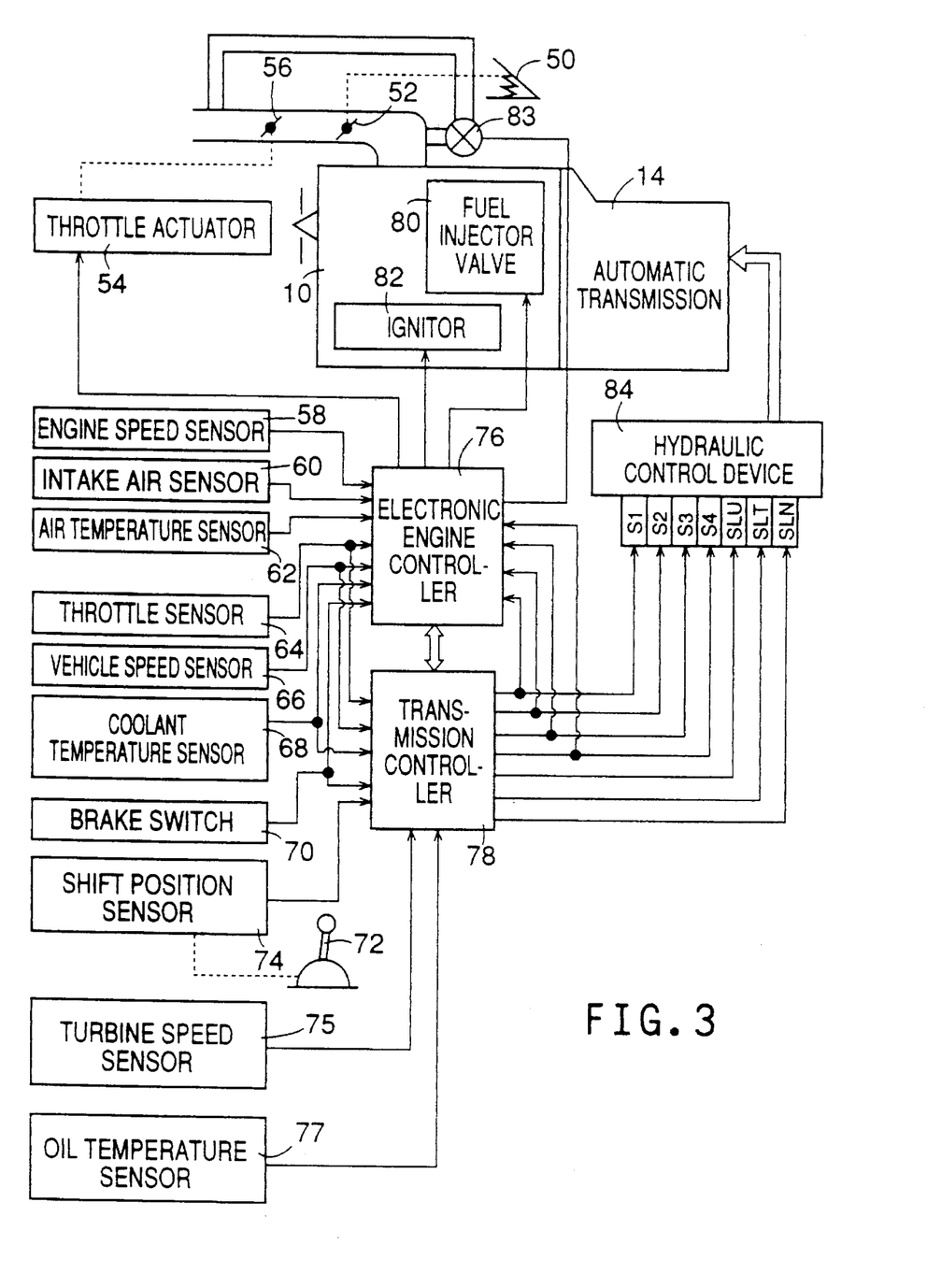
FIG. 3 is a block diagram illustrating a control system for the automatic transmission, which includes the control apparatus embodying the invention including hydraulic and electric control devices.

Referring next to FIG. 3, a first throttle valve 52 and a second throttle valve 56 are disposed within an intake pipe connected to the engine 10 of the vehicle. The first throttle valve 52 is manually operated by an accelerator pedal 50, while the second throttle valve 56 is automatically operated by a throttle actuator 54, which is controlled by an electronic engine controller 76 provided to control the engine 10. This engine controller 76 is adapted to receive output signals of an engine speed sensor 58, an intake air sensor 60, an air temperature sensor 62, a throttle sensor 64, a vehicle speed sensor 66, a coolant temperature sensor 68, a brake switch 70, and a shift position sensor 74.

The output signal of the engine speed sensor 58 represents a speed $N_E$ of the engine 10. The output signal of the intake air sensor 60 represents an intake air quantity Q of the engine 10. The output signal of the air temperature sensor 62 represents a temperature THa of the intake air introduced into the intake pipe of the engine 10. The output signal of the throttle sensor 64 represents an opening angle θth of the first throttle valve 52. This throttle sensor 64 is provided with an idling detector switch adapted to detect that the first throttle valve 52 is placed in the fully closed position, that is, that the engine 10 is idling. The output signal of the vehicle speed sensor 66 represents the speed of the output shaft 42 of the transmission 14, and therefore indicates a running speed V of the vehicle. The output signal of the coolant temperature sensor 68 represents a temperature THw of a coolant of the engine 10. The output signal of the brake switch 70 represents an operating state BK of a brake pedal. The output signal of the shift position sensor 72 represents a currently selected position Psh of a shift lever 72 provided on the vehicle. The shift lever 72 has a parking position P, a reverse position R, a neutral position N, a drive position D, and two or more other drive positions 3, 2, L.

The output signals of the sensors and switches indicted above are also received by an electronic transmission controller 78 provided to control the transmission 14 and the lock-up clutch 24. The transmission controller 78 is also adapted to receive the output signal of a turbine speed sensor 75 representative of a speed $N_T$ of the turbine runner 22, and the output signal of an oil temperature sensor 77 representative of a temperature $T_{OIL}$ of a working fluid used in the hydraulic system.

The electronic engine controller 76 is constituted by a so-called microcomputer incorporating a CPU (central processing unit), a RAM (random-access memory), a ROM (read-only memory), and an input/output interface. The CPU operates to process input signals for controlling the engine 10, according to control programs stored in the ROM, while utilizing a temporary data storage function of the ROM. Described in detail, the engine controller 76 controls a fuel injector valve 80 for controlling the amount of a fuel to be injected into the engine 10, an ISC valve (idling speed control valve) 83 for adjusting the idling speed of the engine 10, and the throttle actuator 54 for controlling the second throttle valve 56 as indicated above. In a fuel-cut mode, the engine controller 76 closes the fuel injection valve 80 during deceleration of the vehicle, for example, when the first throttle valve 52 is fully closed. In this case, the valve 80 is held closed as long as the engine speed $N_E$ is higher than a predetermined fuel-cut speed $N_{CUT}$. The ISC valve 83 is operated to increase the idling speed of the engine 10 when the temperature of the engine 10 is lower than a predetermined lower limit, or when an air conditioner of the vehicle is on.

The electronic transmission controller 78 is also constituted by a microcomputer similar to that of the engine controller 76. The CPU of the controller 78 operates to process input signals for controlling a hydraulic control device 84, according to control programs stored in the ROM, while utilizing a temporary data storage function of the RAM. The hydraulic control device 84 includes the solenoid-operated valves S1-S3 indicated above, another solenoid-operated valve S4, and linear solenoid valves SLU, SLT and SLN. The transmission controller 78 controls the linear solenoid valve SLT so as to produce an output pressure PSLT corresponding to the opening angle θth of the first throttle valve 52. Further, the transmission controller 78 controls the linear solenoid valve SLN for regulating a back pressure of each accumulator provided for the clutches C0–C2 and brakes B0–B4 indicated above, and the linear solenoid valve SLU for adjusting the amount of slip of the lock-up clutch 24. When the amount of slip of the lock-up clutch 24 is zero, the clutch 24 is considered to be placed in the fully engaged position.

The transmission controller 78 also functions to select one of the operating positions of the automatic transmission 14 and the operating state of the lock-up clutch 24, according to predetermined shift patterns and on the basis of the detected opening angle θth of the first throttle valve 52 and the detected vehicle speed V, as well known in the art. The controller 78 commands the solenoid-operated valves S1, S2, S3 so as to shift the transmission 14 to the determined operating position, and de-energizes the solenoid-operated valve S4 when it is required to Place the automatic transmission 14 in an engine-braking state. The valve S4 is provided to disable the one-way clutches F1, F2 so that a torque can be transmitted through the transmission 14 in the reverse direction from the drive wheels of the vehicle toward the engine, to provide an engine braking effect when needed.

The lock-up clutch 24 is placed in the released (fully released) position when the transmission 14 is placed in the first-speed position "1st" or second-speed position "2nd". When the transmission 14 is placed in the third-speed position "3rd" or fourth-speed position "4th", the lock-up clutch 24 is placed in a partially engaged or fully engaged position, depending upon the opening angle θth of the first throttle valve 52 and the vehicle speed V. In the partially engaged position, the amount of slip of the lock-up clutch 24 is suitably controlled as described below, so as to minimize a power loss at the torque converter 12 while absorbing a rotational variation of the engine 10. When the transmission 14 is placed in the fifth-speed position "5th", the lock-up clutch 24 is placed in the fully engaged position. When the vehicle is decelerating or coasting with the first throttle valve 52 placed in the fully closed position, the lock-up clutch 24 is fully engaged to hold the engine 10 in the fuel cut mode for a longer period of time, with the engine speed $N_E$ maintained above the predetermined fuel-cut speed $N_{CUT}$.

Figure 4:
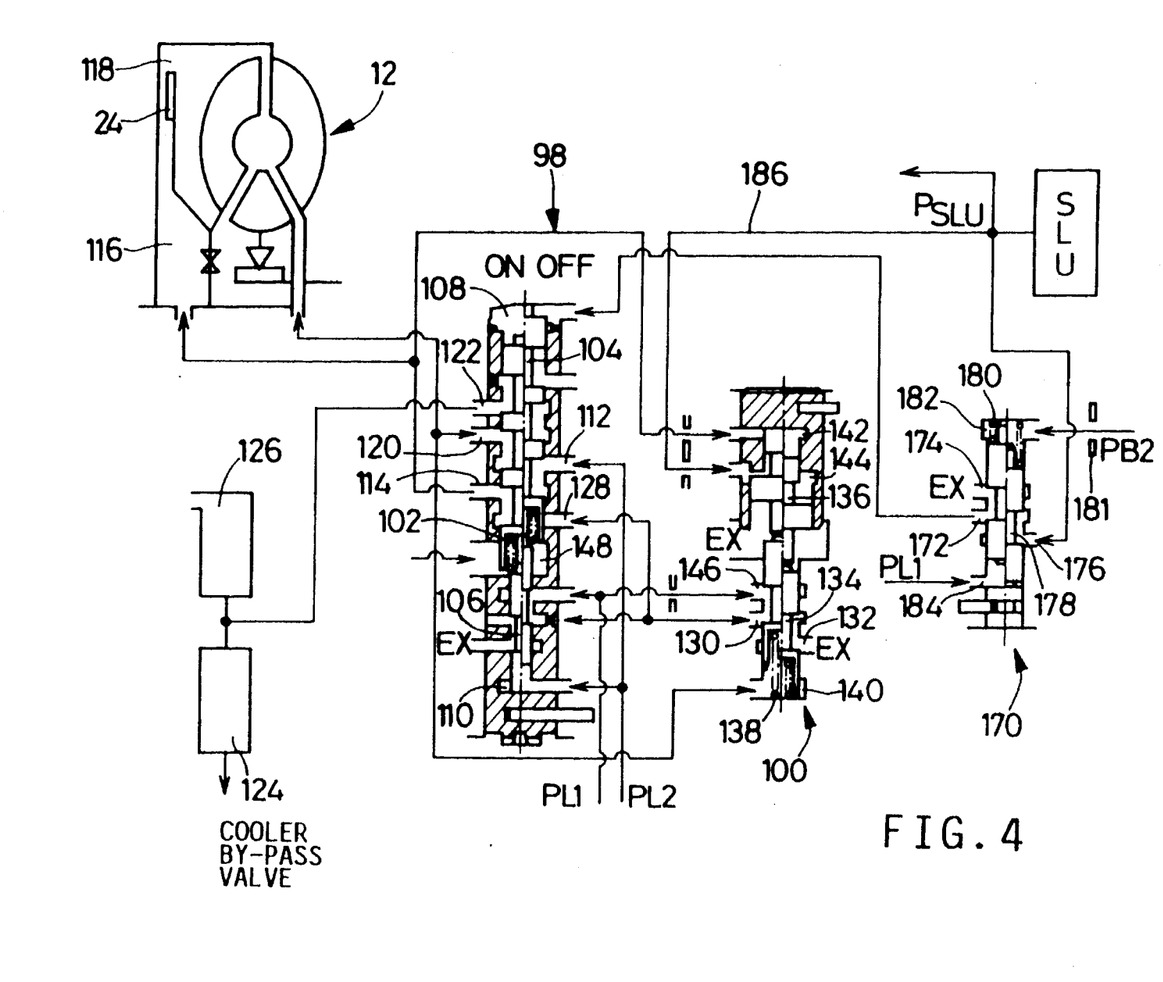
FIG. 4 is a view explaining a portion of the hydraulic control device of the control apparatus of FIG. 3.

Referring to FIG. 4, the hydraulic control device 84 will be described. In the figure, $P_{SLU}$ represents an output pressure generated by the linear solenoid valve SLU indicated above, which receives an input pressure from a modulator valve (not shown). The output pressure $P_{SLU}$ varies with the level of a drive signal $I_{SLU}$ (indicated in FIG. 7) applied to the linear solenoid valve SLU. The generated output pressure $P_{SLU}$ is applied to a lock-up relay valve 98 and a lock-up control valve 100.

The lock-up relay valve 98 includes: a first and a second spool 104, 106 which are axially movable and abuttable on each other; a spring 102 interposed between the first and second spools 104, 106; an oil chamber 108 formed at one end of the first spool 104 remote from the second spool valve 106, and adapted to receive the output pressure $P_{SLU}$ so as to bias the first and second spools 104, 106 in a direction toward a first or ON position for placing the lock-up clutch 24 in the fully engaged position; and an oil chamber 110 adapted to receive a second line pressure $P_{L2}$ so as to bias the spools 104, 106 in a direction toward a second or OFF position for placing the lock-up clutch 24 in the fully released position. When the first spool 104 is placed in the first or ON position, the second line pressure $P_{L2}$ supplied to an input port 112 is fed through a releasing port 114 to a releasing oil chamber 116 of the torque converter 12, while at the same time the fluid in an engaging oil chamber 118 of the torque converter 12 is discharged into a cooler by-pass valve 124 or an oil cooler 126 through an engaging port 120 and a drain port 122. When the first spool 104 is placed in the second or OFF position, the second line pressure $P_{L2}$ supplied to the input port 112 is fed through the engaging port 120 to the engaging oil chamber 118 of the torque converter 12, while at the same time the fluid in the releasing oil chamber 116 of the torque converter 12 is discharged through the releasing port 114, and returned to a reservoir through a control port 130 and a drain port 132 of the lock-up control valve 100.

When the output pressure $P_{SLU}$ of the linear solenoid valve SLU is lower than a certain threshold level, the first spool 104 is placed in the OFF position by a thrust force based on the second line pressure $P_{L2}$, whereby the lock-up clutch 24 is released, that is, brought to the fully released position. The OFF position of the first spool 104 is indicated on the right side of the center line of the lock-up relay valve 98 in FIG. 4. When the output pressure $P_{SLU}$ exceeds the threshold level, the first spool 104 is placed in the ON position by a thrust force based on the output pressure $P_{SLU}$, whereby the lock-up clutch 24 is partially or fully engaged. The ON position of the spool 104 is indicated on the left side of the center line of the valve 98 in FIG. 4. The amount of slip of the lock-up clutch 24 in the partially engaged state is controlled by the lock-up control valve 100, depending upon the output pressure $P_{SLU}$.

The lock-up control valve 100 is provided to regulate the amount of slip of the lock-up clutch 24 depending on the output pressure $P_{SLU}$, when the lock-up relay valve 98 is in the ON position. The valve 100 includes: a spool 134; a plunger 136 adapted to abut on the spool 134 and thereby apply a thrust to the spool 134 so that the spool 134 is moved to a discharge position indicated on the right side of the center line of the valve 100 in FIG. 4; a spring 138 for biasing the spool 134 toward a supply position indicated on the left side of the center line; an oil chamber 140 in which the spring 138 is accommodated and which is adapted to receive a pressure $P_{ON}$ in the engaging oil chamber 118 of the torque converter 12, for biasing the spool 134 toward the supply position; an oil chamber 142 adapted to receive a pressure $P_{OFF}$ in the releasing oil chamber 116 of the torque converter 12, for biasing the spool 134 toward the discharge position; and an oil chamber 144 formed in an axially intermediate portion of the plunger 136, and adapted to receive the output pressure $P_{SLU}$.

When the spool 134 is placed in the discharge position, the control port 130 and the drain port 132 communicate with each other, whereby the engaging torque of the lock-up clutch 24 is increased. When the spool 134 is placed in the supply position, a supply port 146 receiving a first line pressure $P_{L1}$ is brought into communication with the control port 130, and the first line pressure $P_{L1}$ is applied to the releasing oil chamber 116 of the torque converter 12, whereby the engaging torque of the lock-up clutch 24 is reduced. In other words, the lock-up control valve 100 is adapted to control the engaging torque of the lock-up clutch 24, by regulating a difference between the pressures in the engaging and releasing oil chambers 118, 116 of the torque converter 12, depending upon the output pressure $P_{SLU}$. Thus, the amount of slip of the lock-up clutch 24 is controlled by the drive signal $I_{SLU}$ applied to the linear solenoid valve SLU. As indicated before, the lock-up clutch 24 is in the fully engaged position when the amount of slip is zero.

It will be understood from the above description that the engaging torque of the lock-up clutch 24 increases as the output pressure $P_{SLU}$ of the linear solenoid valve SLU increases above the above-indicated threshold level. To release the lock-up clutch 24, that is, to bring the lock-up clutch 24 to its fully released position, the level of the drive signal $I_{SLU}$ applied to the valve SLU from the transmission controller 78 is lowered so that the output pressure $P_{SLU}$ is lower than the above-indicated threshold value. To bring the lock-up clutch 24 to its fully engaged position, the level of the drive signal $I_{SLU}$ is increased so that the output pressure $P_{SLU}$ is increased to a predetermined maximum level. In the partially engagement mode of the lock-up clutch 24, the level of the drive signal $I_{SLU}$ is controlled so that the output pressure $P_{SLU}$ changes between the above-indicated threshold level and the maximum level.

A solenoid relay valve 170 is connected between the linear solenoid valve SLU and the lock-up relay valve 98. The solenoid relay valve 170 includes: an output port 172 connected to the oil chamber 108 of the lock-up relay valve 98; a drain port 174; an input port 176 adapted to receive the output pressure $P_{SLU}$ generated by the linear solenoid valve SLU; a spool 178 movable between a first position in which the output port 172 communicates with the drain port 174, and a second position in which the output port 172 communicates with the input port 176; a spring 180 for biasing the spool 178 toward the second position; an oil chamber 182 in which the spring 180 is accommodated and which is adapted to receive through an orifice 181 a pressure PB2 which is generated to activate the brake B2 for establishing the third-speed position "3rd" or higher speed position and which biases the spool 178 toward the second position; and an oil chamber 184 adapted to receive the first line pressure $P_{L1}$ for biasing the spool 178 toward the first position. Since the pressure $P_{B2}$ is applied to the oil chamber 182 to move the spool 178 to the second position when the transmission 14 is placed in one of the third-, fourth- and fifth-speed positions "3rd","4th", "5th", the output pressure $P_{SLU}$ is fed from the solenoid relay valve 170 to the oil chamber 108 of the lock-up relay valve 98, and the valve 98 is placed in the first or ON position for partial or full engagement of the lock-up clutch 24, only when the transmission 14 is placed in the third-speed position "3rd" or higher speed position. It is noted that the second line pressure $P_{L2}$ is obtained by lowering the first line pressure $P_{L1}$, and that the first line pressure $P_{L1}$ is always higher than the second line pressure $P_{L2}$.

An oil passage 186 is provided for connecting the linear solenoid valve SLU to the oil chamber 144 of the lock-up control valve 100, so that the output pressure $P_{SLU}$ is fed from the linear solenoid valve SLU directly to the oil chamber 144, without via the solenoid relay valve 170. This oil passage 186 is provided to operate the lock-up control valve 100 with the output pressure $P_{SLU}$, in a diagnostic routine for detecting an abnormality that the lock-up relay valve 98 is stuck in its ON position. Since the understanding of this feature is not essential to understand the principle of the present invention, no further description on the feature is provided herein.

Figure 5:
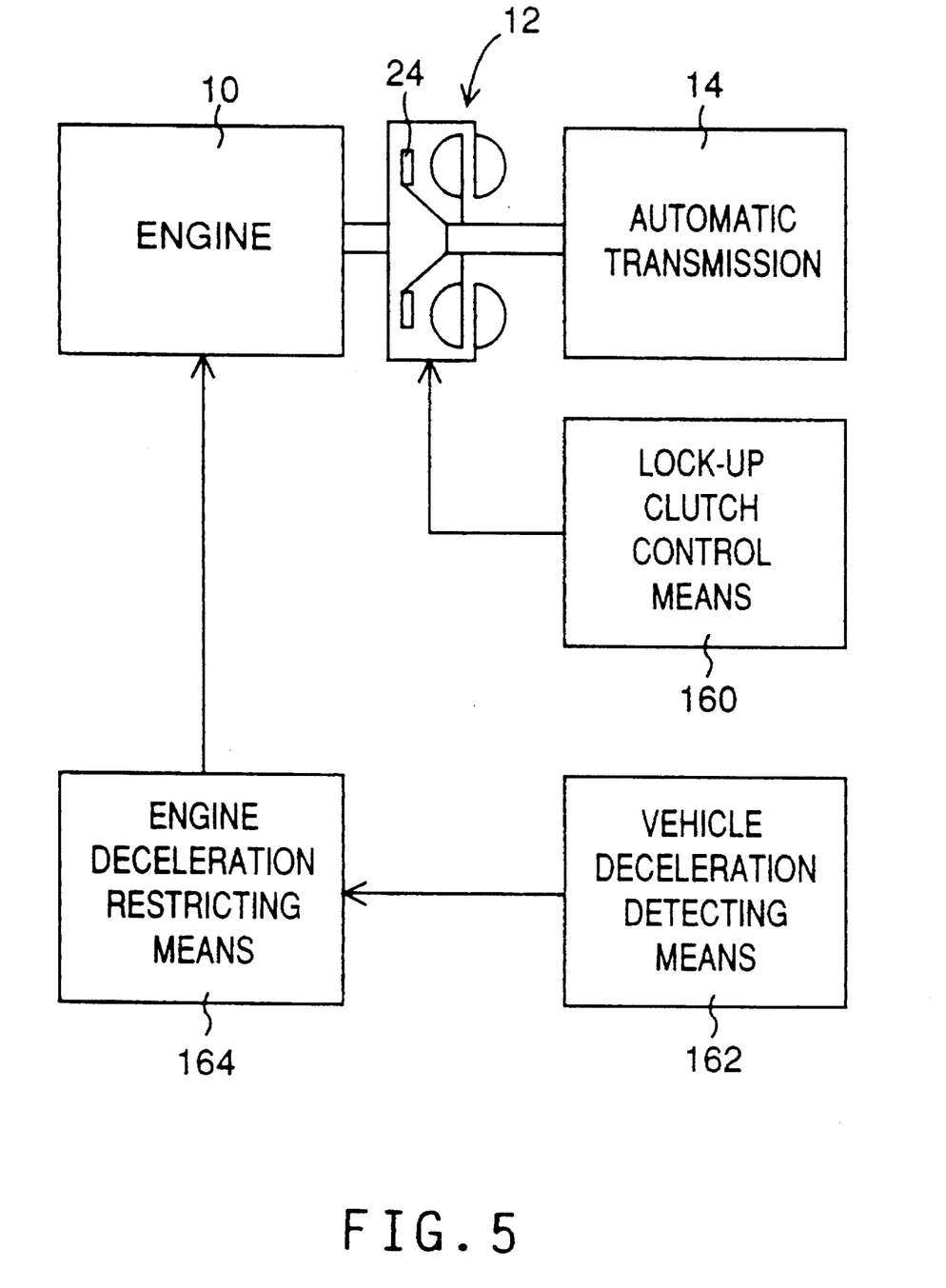
FIG. 5 is a block diagram showing functional elements of an engine controller of the control apparatus of FIG. 3.

Referring next to FIG. 5, the functions of the engine controller 76 and the transmission controller 78 which relate to the principle of the present invention will be described.

The transmission controller 78 incorporates lock-up clutch control means 160 for bringing the lock-up clutch 24 to its fully engaged position during deceleration of the vehicle. On the other hand, the engine controller 76 incorporates vehicle deceleration detecting means 162 for detecting a decelerating state of the motor vehicle, and engine deceleration restricting means 164 for restricting a rate of decrease of the engine speed $N_E$ for a period following detection of the decelerating state of the motor vehicle by said vehicle deceleration detecting means. Since the rate of decrease of the engine speed $N_E$ after the detection of the decelerating state of the vehicle is restricted, the difference between the engine speed $N_E$ and the speed $N_T$ of the input shaft 20 of the transmission 14 (speed $N_T$ of the turbine runner 22) is reduced, so that the lock-up clutch 24 can be smoothly or easily brought to the fully engaged position by the lock-up clutch control means 160, even when the vehicle is decelerating with a negative drive torque, that is, even when a torque is transmitted in the direction from the drive wheels toward the engine 10.

Figure 6:
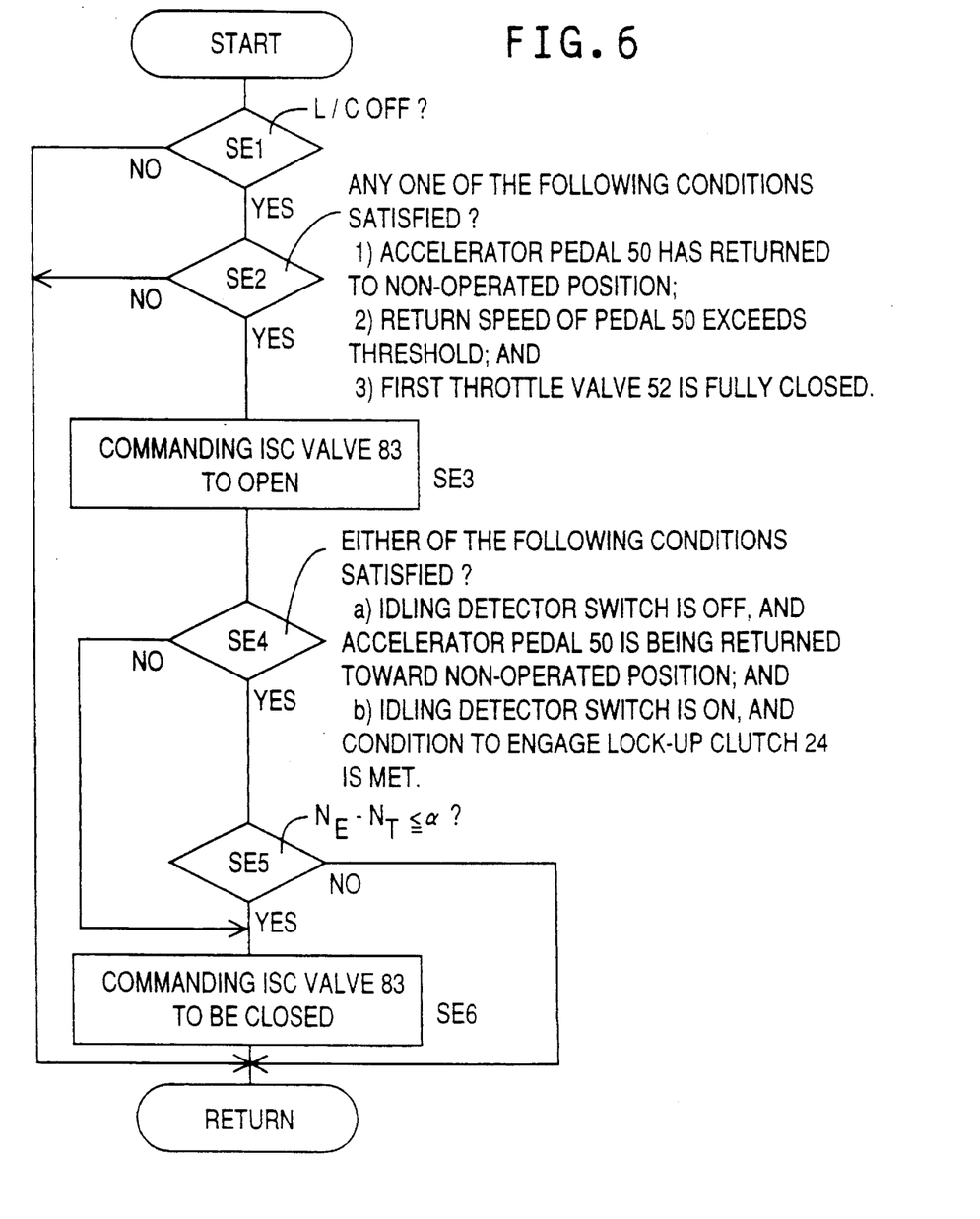
FIG. 6 is a flow chart illustrating a control routine executed by the engine controller of the control apparatus of FIG. 3.
Figure 7A:
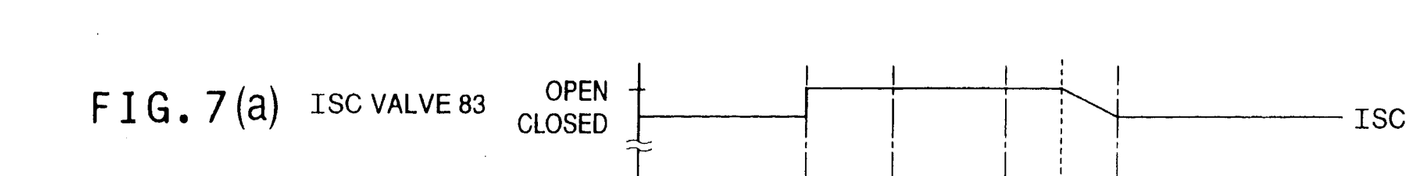
FIGS. 7(a)–7(d) illustrate a time chart explaining the operation of the engine controller according to the control routine of FIG. 6.
Figure 7B:
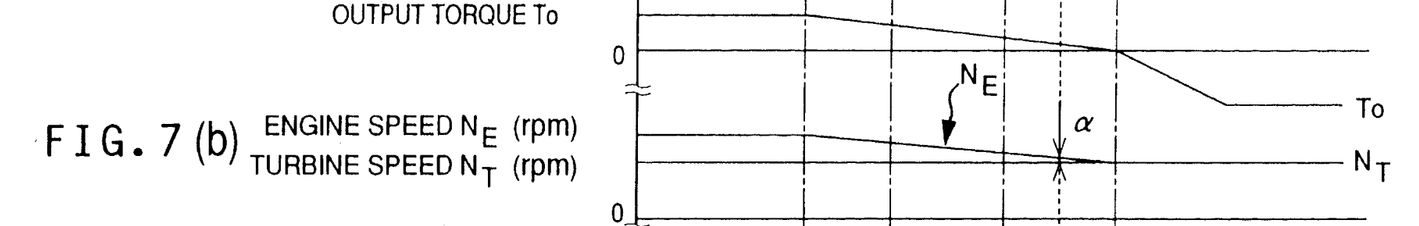
Figure 7C:
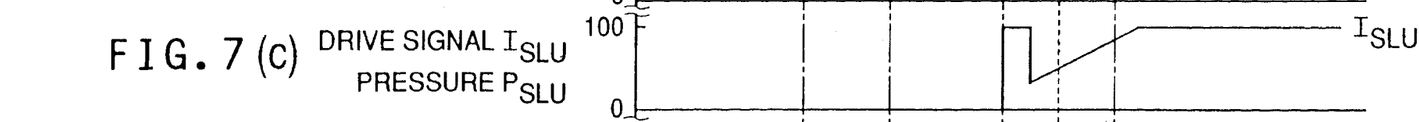
Figure 7D:
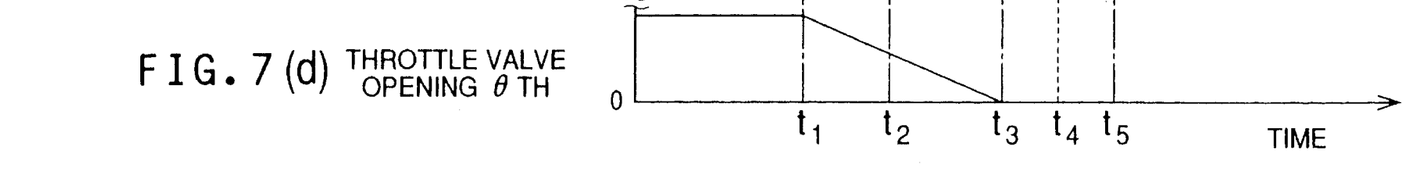

Reference is now made to the flow chart of FIG. 6 illustrating a routine executed by the engine controller 76, more specifically, operations of the vehicle deceleration detecting means 162 and the engine deceleration restricting means 164. The routine is initiated with step SE1 to determine whether the lock-up clutch 24 is in the fully released position. If the lock-up clutch 24 is not placed in the fully released position, one cycle of the routine is terminated. Thus, step SE1 is repeatedly implemented. If an affirmative decision (YES) is obtained in step SE1, the control flow goes to step SE2 to determine whether any one of the following three conditions is satisfied:

1) the depressed accelerator pedal 50 has returned to the original or non-operated position;

2) the speed of the return movement of the accelerator pedal 50 toward the non-operated position exceeds a predetermined threshold; and 3) the first throttle valve 52 is fully closed, namely, the idling detector switch of the throttle sensor 64 is ON.

It will be understood that step SE2 corresponds to the vehicle deceleration detecting means 162 for detecting a decelerating state of the vehicle.

If a negative decision (NO) is obtained in step SE2, the present routine is terminated. If the accelerator pedal 50 has returned to the non-operated position, for example, an affirmative decision (YES) is obtained in step SE2, and the control flow goes to step SE3 to open the ISC valve 83 (idling control valve), as indicated at t1 in the time chart of FIG. 7(a). It is noted that the opening angle θth of the throttle valve 52 cannot be zeroed at the moment t1 when the accelerator pedal 50 has returned to the non-operated position. Namely, there is a time delay between the moment t1 and a moment t3 at which the throttle valve 52 is fully closed (FIG. 7(a) Step SE3 corresponds to the engine deceleration restricting means 164. As a result of opening the ISC valve 83, the amount of an air-fuel mixture into the engine 10 is increased, whereby the rate of decrease of the engine speed $N_E$ is made lower than that when the ISC valve 83 is in the closed position.

Step SE3 is followed by step SE4 to determine whether either one of the following conditions is satisfied:

a) the idling detector switch of the throttle sensor 64 is OFF, and the accelerator pedal 50 is in the process of returning to the non-operated position; and b) the idling detector switch is ON, and the condition for engagement of the lock-up clutch 24 is met.

Step SE4 is provided to determine, based on the operating state of the accelerator pedal 50, whether the ISC valve 83 should be closed, namely, whether the restriction of the decrease rate of the engine speed $N_E$ should be terminated. If a negative decision (NO) is obtained in step SE4, this means that the accelerator pedal 50 is not in the process of returning toward the non-operated position, and that there is a possibility of the accelerator pedal 50 being depressed again for acceleration of the vehicle. Alternatively, the negative decision in step SE4 means that the condition for engaging the lock-up clutch 24 is not met even with the accelerator pedal 50 fully closed. In such cases, step SE4 is followed by step SE6 to close the ISC valve 83 for thereby restoring the increased amount of the air-fuel mixture introduced into the engine 10, to the normal amount corresponding to the opening angle θth of the throttle valve 52.

If an affirmative decision (YES) is obtained in step SE4, this means that the accelerator pedal 50 is in the process of returning toward the non-operated position or the condition for engaging the lock-up clutch 24 is met with the accelerator pedal 50 being fully closed. In this case, the control flow goes to step SE5 to determine whether a difference ($N_E - N_T$) between the engine speed $N_E$ and the speed $N_T$ of the turbine running 22 (input shaft 20 of the transmission 14) is equal to or smaller than a predetermined reference value α. If the speed difference ($N_E - N_T$) is reduced down to the reference value α, this means that the lock-up clutch 24 is substantially fully engaged.

If a negative decision (NO) is obtained in step SE5, this means that the lock-up clutch 24 has not been fully engaged, and one cycle of execution of the present routine is terminated without implementation of step SE6. While the routine of FIG. 6 is repeatedly executed, the accelerator pedal 50 has returned to the non-operated position, and the opening angle θth of the throttle valve 62 is zeroed, whereby the idling detector switch of the throttle sensor 64 is turned ON. Consequently, the transmission controller 78 commands the hydraulic control device 84 to engage the lock-up clutch 24. Namely, the drive signal $I_{SLU}$ is applied to the linear solenoid valve SLU, as indicated at t3 in FIG. 7(c). For improved response of the lock-up clutch 24, the level of the drive signal $I_{SLU}$ is instantaneously raised to the 100% level at the moment t3. Thereafter, the level of the drive signal $I_{SLU}$ is once lowered, and is then slowly raised up to the 100% level again for full engagement of the lock-up clutch 24. As described above, the ISC valve 83 is opened at the moment t1 upon detection of the return of the accelerator pedal 50 to the non-operated position, and is held in the open position to maintain the engine speed $N_E$ at a level higher than the speed $N_T$ of the turbine running 22, for at least an initial period of engagement of the lock-up clutch 24.

When an affirmative decision (YES) is obtained in step SE5, the engine controller 76 commands the ISC valve 83 to be closed in step SE6, and the control flow goes back to step SE1. In the specific example of FIG. 7(b), the speed difference ($N_E - N_T$) is reduced to the reference value α at point t4, whereby the ISC valve 83 is commanded to be closed at this point t4, and is brought to the fully closed position at point t5. A time delay t4-t5 is considered to be a response time of the valve 83. The reference value α indicated above is determined so that the ISC valve 83 has been fully closed at substantially the same time when the lock-up clutch 24 has been brought to the fully engaged state.

In the present embodiment described above, the rate of decrease of the engine speed $N_E$ is restricted or restrained in step SE3 by the engine deceleration restricting means 164, if and immediately after a decelerating state of the vehicle is detected in step SE2 by the vehicle deceleration detecting means 162. As a result of restriction of the decrease rate of the engine speed $N_E$ immediately after the detection of the vehicle deceleration, the engine speed $N_E$ is prevented from being lowered below the input speed $N_T$ of the transmission 14, and the speed difference $N_E - N_T$ is maintained at a value which is sufficiently small to permit an easy, smooth engaging action of the lock-up clutch even when the vehicle is decelerating or coasting with a negative drive torque. However, the engine speed $N_E$ may be lowered below the transmission input speed $N_T$ as long as the difference $N_E - N_T$ is sufficiently small.

Figures 8A, 8B:
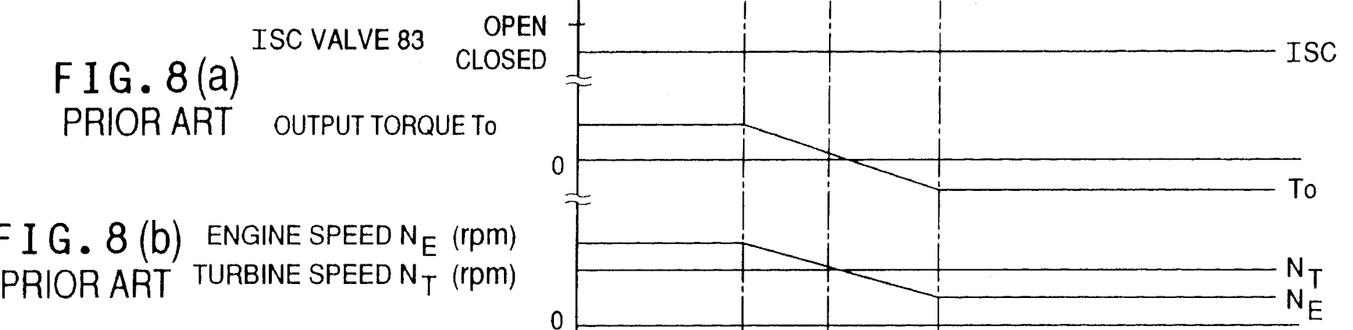
FIGS. 8(a)–8(d) illustrate a view corresponding to that of FIG. 7, explaining an operation of a known engine controller.
Figure 8C:
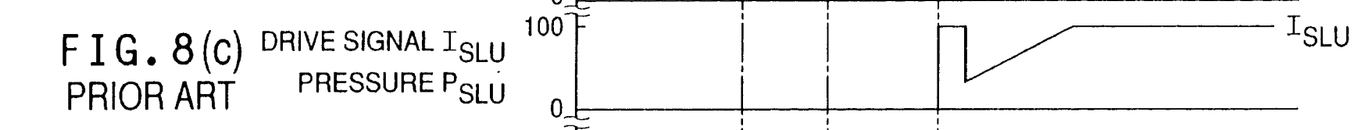
Figure 8D:
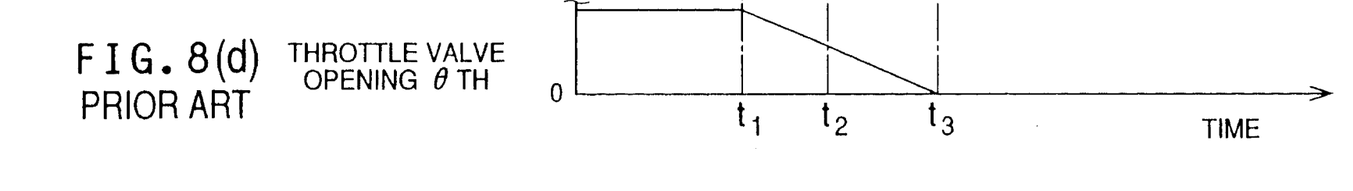

The above advantage of the present arrangement will be better understood by reference to FIGS. 8(a-8(d) which show an operation of the conventional arrangement wherein the vehicle deceleration detecting means 162 and the engine deceleration restricting means 164 are not provided and the routine of FIG. 6 is not executed. In the example of FIGS. 8(a-8(d), the engine speed $N_E$ is lowered at a relatively high rate after the deceleration of the vehicle is started (with the accelerator pedal 50 being released, for example) at point t1. The engine speed NE decreases with a decrease in the opening angle θth of the throttle valve 52. Consequently, the engine speed $N_E$ is lowered below the speed $N_T$ of the turbine runner 22, and the difference $N_E - N_T$ is considerable at point t3 at which the idling detector switch of the throttle sensor 64 is turned ON and the lock-up clutch 24 is commanded to be engaged. In this condition, the lock-up clutch 24 cannot be smoothly engaged, due to the operating characteristic of the damper 23 when the engine speed $N_E$ is considerably lower than the input speed $N_T$ of the transmission 14 and the vehicle is in deceleration with a negative drive torque. That is, the damper 23 is constructed to absorb an engaging shock of input and output coupling members of the lock-up clutch 24 when the engine speed $N_E$ is higher than the transmission input speed $N_T$. Therefore, when the engine speed $N_E$ is lower than the transmission input speed NT, the difficulty of engagement of the lock-up clutch 24 increases with an increase in the speed difference between the engine 10 and the transmission input shaft, i.e., between the input and output coupling members of the clutch 24 which are connected to the crankshaft 16 and the damper 23, respectively.

The present embodiment is further advantageous in that the ISC valve 83 is commanded to be closed when the speed difference $N_E - N_T$ is reduced down to the predetermined reference value α, so that the moment of complete closure of the ISC valve 83 can substantially coincide with the moment of full engagement of the lock-up clutch 24.

While the present invention has been described above in detail by reference to the accompanying drawings, it is to be understood that the invention may be otherwise embodied.

In the illustrated embodiment, the ISC valve 83 is used to restrict the rate of decrease of the engine speed $N_E$ upon detection of a decelerating state of the vehicle, however the fuel injector valve 80 may be used. In this case, the fuel injector valve 80 is activated to inject a given amount of fuel into the engine 10 even when the accelerator pedal 50 is not in operation. It is noted that the lock-up clutch 24 is engaged before the fuel cut of the engine 10 is started, and that the fuel injector valve 80 is closed to effect the fuel cut. Therefore, when the injector valve 80 is used to restrict the rate of decrease of the engine speed, the fuel injector valve 80 is first opened to restrict the engine speed decrease rate, and is then closed to start the fuel cut after the lock-up clutch 24 is engaged.

While the engine controller 76 is used to execute the routine of FIG. 6, namely, to control the ISC valve 83, the transmission controller 78 may be used to execute the routine of FIG. 6 for controlling the ISC valve 83 as described above. In this instance, the input signals applied to the engine controller 76 are also applied to the transmission controller 78.

While step SE2 of the routine of FIG. 6 of the illustrated embodiment is adapted to determine whether any one of the three conditions is satisfied, it is possible to determine in step SE2 whether only one of these conditions is satisfied. For example, step SE2 is adapted to determine whether the accelerator pedal 50 has returned to the non-operated position. Similar modification is possible in connection with step SE4.

It is also to be understood that the present invention may be embodied with various other changes, modifications and improvements, which may occur to those skilled in the art, without departing from the spirit and scope of the invention defined in the following claims.

What is claimed is:

1. An apparatus for controlling an engine of a motor vehicle, and a lock-up clutch disposed between the engine and an automatic transmission for direct connection therebetween, wherein lock-up clutch control means is provided for engaging said lock-up clutch during deceleration of the motor vehicle, said apparatus comprising:

vehicle deceleration detecting means for detecting a decelerating state of the motor vehicle; and engine deceleration restricting means, responsive to an output indicating vehicle deceleration by said detecting means, for restricting a rate of decrease of a speed of said engine for a period following detection of said decelerating state of the motor vehicle by said vehicle deceleration detecting means, said lock-up clutch control means commanding said lock-up clutch to be engaged after said engine deceleration restricting means is operated said restricting means being disabled after said lockup clutch has been commanded to be engaged.

2. An apparatus according to claim 1, wherein said vehicle has an accelerator pedal for adjusting an output of said engine, and said vehicle deceleration detecting means includes determining means for determining whether said accelerator pedal has returned to a non-operated position thereof, said vehicle deceleration detecting means detecting said decelerating state of the motor vehicle when said determining means determines that said accelerator pedal has returned to said non-operated position.

3. An apparatus according to claim 1, wherein said vehicle has an accelerator pedal for adjusting an output of said engine, and said vehicle deceleration detecting means includes detecting means for detecting a speed of a return movement of said accelerator pedal to a non-operated position thereof, and determining means for determining whether said speed of the return movement of said accelerator pedal is higher than a predetermined threshold, said vehicle deceleration detecting means detecting said decelerating state of the motor vehicle when said determining means determines that said speed of said return movement is higher than said predetermined threshold.

4. An apparatus according to claim 1, wherein said engine has a throttle valve for adjusting an output of the engine, and said vehicle deceleration detecting means includes determining means for determining whether said throttle valve is fully closed, said vehicle deceleration detecting means detecting said decelerating state of the motor vehicle when said determining means determines that said throttle valve is fully closed.

5. An apparatus according to claim 1, wherein said engine has an idling speed control valve for controlling an idling speed of said engine, and said engine deceleration restricting means comprises said idling speed control valve, and commanding means for activating said idling speed control valve so that said rate of decrease in the speed of said engine is made lower after said decelerating state of the motor vehicle is detected by said vehicle deceleration detecting means, than before said decelerating state of the motor vehicle is detected.

6. An apparatus according to claim 1, further comprising:

first speed detecting means for detecting said speed of said engine;

second speed detecting means for detecting an input speed of said automatic transmission;

determining means for determining whether a difference between the speed of said engine and said input speed of the transmission lower than the speed of the engine has been reduced to a predetermined reference value; and disabling means for disabling said engine deceleration restricting means to stop restricting said rate of decrease in the speed of said engine, when said determining means determines that said difference has been reduced to said predetermined reference value.

7. An apparatus according to claim 6, wherein said engine has an idling speed control valve for controlling an idling speed of said engine, and said engine deceleration restricting means comprises said idling speed control valve, and commanding means for opening said idling speed control valve so that said rate of decrease in the speed of said engine is made lower after said decelerating state of the motor vehicle is detected by said vehicle deceleration detecting means, than before said decelerating state of the motor vehicle is detected, and wherein said disabling means commands said idling speed control valve to be closed, when said difference has been reduced to said predetermined reference value.

8. An apparatus according to claim 1, further comprising fuel-cut means for cutting a fuel supply to said engine when said vehicle deceleration detecting means detects said decelerating state of the motor vehicle, and wherein said lock-up clutch control means commands said lock-up clutch to be engaged when said fuel-cut means is operated.

9. An apparatus according to claim 1, wherein said lock-up clutch comprises an input coupling member connected to said engine, an output coupling member for frictional coupling with said input coupling member, and a damper interposed between said output coupling member and an input shaft of said automatic transmission, said damper being constructed to absorb an engaging shock of said input and output coupling members when the speed of said engine is higher than a speed of said input shaft of the transmission.

10. An apparatus according to claim 1, wherein said motor vehicle has a torque converter including a pump impeller connected to said engine, and a turbine runner connected to said automatic transmission, said lock-up clutch being provided for direct connection of said pump impeller and said turbine runner when said lock-up clutch is engaged.

11. An apparatus for controlling an engine of a motor vehicle, and a lock-up clutch disposed between the engine and an automatic transmission for direct connection therebetween, wherein lock-up clutch control means is provided for engaging said lock-up clutch during deceleration of the motor vehicle, said apparatus comprising:

vehicle deceleration detecting means for detecting a decelerating state of the motor vehicle; and engine deceleration restricting means, responsive to an output of said vehicle deceleration detecting means, for restricting a rate of decrease of a speed of said engine for a period following detection of said decelerating state of the motor vehicle by said vehicle deceleration detecting means;

said lock-up clutch control means commanding said lock-up clutch to be engaged after said engine deceleration detecting means is operated;

said apparatus further comprising:

first speed detecting means for detecting said speed of said engine;

second speed detecting means for detecting an input speed of said automatic transmission;

determining means for determining whether a difference between the speed of said engine and said input speed of the transmission lower than the speed of the engine has been reduced to a predetermined reference value; and disabling means for disabling said engine deceleration restricting means to stop restricting said rate of decrease in the speed of said engine, when said determining means determines that said difference has been reduced to said predetermined reference value.

* * * * *